(12) United States Patent
Tsai et al.

(10) Patent No.: US 11,338,539 B2
(45) Date of Patent: May 24, 2022

(54) METHOD FOR MANUFACTURING PAPER STRAW

(71) Applicant: HOU JING SHENG JINGHUA CO., LTD., Taoyuan (TW)

(72) Inventors: Hao-I Tsai, Taichung (TW); Te-Yi Chao, Taoyuan (TW); Li-Yuan Huang, Kaohsiung (TW); Bing-Kwan Cheng, Hong Kong (CN); Yuan-Nan Tsai, Tainan (TW)

(73) Assignee: HOU JING SHENG JINGHUA CO., LTD., Taoyuan (TW)

( * ) Notice: Subject to any disclaimer, the term of this patent is extended or adjusted under 35 U.S.C. 154(b) by 359 days.

(21) Appl. No.: 16/559,108

(22) Filed: Sep. 3, 2019

(65) Prior Publication Data

US 2021/0060890 A1    Mar. 4, 2021

(51) Int. Cl.
*B31D 5/00* (2017.01)
*B32B 1/08* (2006.01)
(Continued)

(52) U.S. Cl.
CPC .............. *B31D 5/0095* (2013.01); *B31C 5/00* (2013.01); *B31D 5/0082* (2013.01); *B31D 5/0086* (2013.01); *B32B 1/08* (2013.01); *B32B 7/0086* (2013.01); *B32B 7/12* (2013.01); *B32B 29/005* (2013.01); *B32B 37/06* (2013.01); *B32B 37/1207* (2013.01);
(Continued)

(58) Field of Classification Search
CPC .. B31D 5/0095; B31D 5/0082; B31D 5/0086; B31C 11/04; B31C 11/06; B31C 5/00; B31F 5/04; B32B 1/08; B32B 2037/1215; B32B 2250/03; B32B 2597/00; B32B 29/005; B32B 37/06; B32B 37/1207; B32B 7/12; B32B 2250/26; B32B 2250/44; B32B 2307/732
See application file for complete search history.

(56) References Cited

U.S. PATENT DOCUMENTS

2020/0022516 A1* 1/2020 Tsai ...................... C08L 75/04
2020/0146483 A1* 5/2020 Zhao ................... A47G 21/186

FOREIGN PATENT DOCUMENTS

TW            202007324    *   7/2019

* cited by examiner

*Primary Examiner* — Yan Lan
(74) *Attorney, Agent, or Firm* — Rabin & Berdo, P.C.

(57) ABSTRACT

The present invention relates to a method for manufacturing a paper straw, the method comprising: a paper roll transmission step, a paper strip heating step, a bonding and shaping step and a cutting step. Wherein, a plurality of raw paper rolls face a connection position jointly to transmit a raw paper strip, the raw paper strip includes a paper material and a dry hot-melt adhesive. The dry hot-melt adhesive of the raw paper rolls is heated for changing into flow hot-melt adhesive. Then the raw paper rolls is transmitted to the connection position for rolling jointly, and the flow hot-melt adhesives are bounded on another raw paper strip to form a pipe. Finally, the pipe is cut to form at least one paper straw after the pipe exceeds a setting length. The present invention uses dry adhesive to manufacture paper straw, without the excessive glue problem and mold phenomenon of the traditional wet bonding method as well as without an extra dry fixing step of traditional manufacture process, so the productivity will be raised significantly, and the defect rate will be reduced.

7 Claims, 8 Drawing Sheets

(51) Int. Cl.
*B32B 7/12* (2006.01)
*B32B 29/00* (2006.01)
*B32B 37/12* (2006.01)
*B32B 37/06* (2006.01)
*B31C 5/00* (2006.01)

(52) U.S. Cl.
CPC ... *B32B 2037/1215* (2013.01); *B32B 2250/03* (2013.01); *B32B 2597/00* (2013.01)

METHOD FOR MANUFACTURING PAPER STRAW

FIELD OF THE INVENTION

The present invention disclosure relates to a method for manufacturing a straw, and more particularly, to a method for manufacturing paper straw that using a dry adhesive to bond a paper.

BACKGROUND OF THE INVENTION

The cuisine culture is evolved and the living standard is improved, package drinks, canned drinks and hand-shaken drinks that made on the spot are everywhere. Therefore, the global consumption of straw is tremendous. The lowest cost plastic straw is the most common straw now; although the plastic straw is convenient, however, it's hard to recycle because user usually litters the plastic after using. This situation will destroy the ecological environment.

The awareness of environmental protection is raising, a reusable metal straw is invented to solve the problem that the traditional plastic straw causes, the metal straw is produced by stainless steel mostly. The advantage of the metal straw is the reusability, however, the metal straw is hard to be popularized to general consumer that wishes convenience because the user has to carry it all the time.

Further, the stainless steel straw needs to be washed or disinfected before reusing it for hygiene. But the aperture of stainless steel straw is too small to clean or disinfect easily, so general consumer worries about the hygiene situation. Therefore, the reusable metal straw can't replace the traditional plastic straw now.

Figure 1:
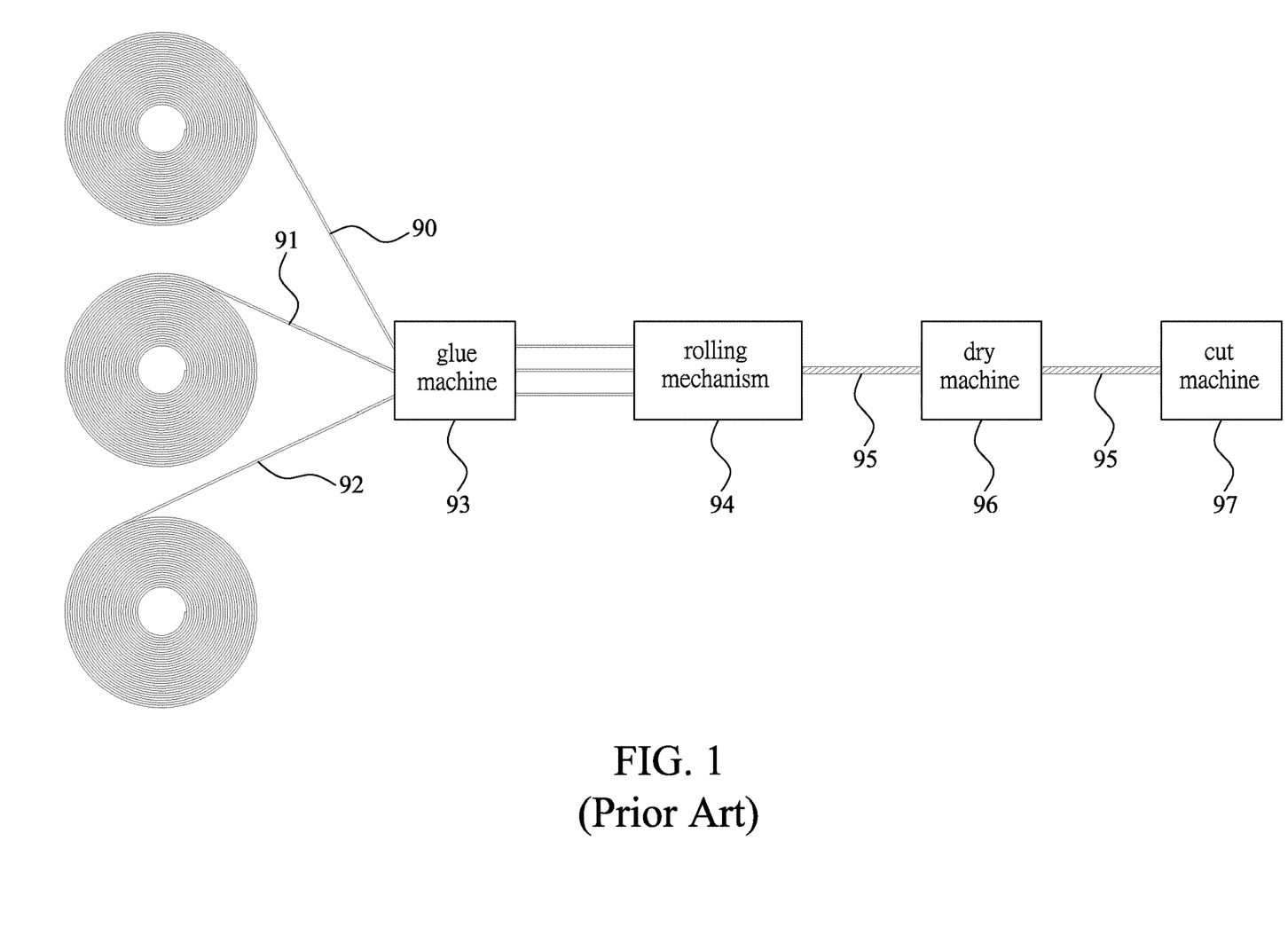
FIG. 1 is a schematic view illustrating a traditional method for manufacturing a paper straw.

Considering the inconvenience of using metal straw, another paper straw is invented for replacing the plastic straw. Please refer to FIG. 1, a manufacture method of traditional paper straw is transmitting three rolls of composite paper simultaneously, so a first paper material 90, a second paper material 91 and a third paper material 92 pass through a glue machine 93, the contact surfaces between the first paper material 90, the second paper material 91 and the third paper material 92 will be coated with a food-grade wet glue. Then, the first paper material 90, the second paper material 91 and the third paper material 92 are collectively moved to a rolling mechanism 94, so the rolling mechanism 94 spirally twists the first paper material 90, the second paper material 91 and the third paper material 92 to produce a paper pipe 95 with three paper layers. A cut machine 96 cut the paper pipe 95 according to the length of paper straw and a dry machine 97 dry the paper straw to solidify the wet glue.

However, while the three paper materials are bonded by wet glue, the water in the outer paper layer can be exhausted in the drying process, but the inner paper layer still has the excessive glue problem or the situation that the water remains in the paper straw, so that the paper straw mold easily and result the problem in food security.

Besides, the experienced operator is needed to reduce the defective product in the present wet manufacture method. The operator needs to watch out for diluting the glue material with water because the water of the glue evaporates in the long-term manufacture status and the concentration of glue would be changed.

If the water of the glue is not enough, the surface of the glue will be dry and reduce the viscosity, causing pseudo attachment and the layer of the paper straw falls off easily. On the contrary, if the water of the glue is too much, the viscosity will be reduced as well and hard to dry. As a result, the production efficiency of the traditional wet manufacture method is hard to be raised and the defect rate of product is hard to be improved significantly.

SUMMARY OF THE INVENTION

A primary object of the present invention is to provide a manufacture method of paper straw that using dry adhesive. In the dry bonding manufacture process, the adhesive and the paper without the traditional excessive glue and fall-off problem and without the mold phenomenon as well. Also, the viscosity of dry bonding is 20%~30% higher than the viscosity of wet bonding.

A second object of the present invention is reducing an extra adhesive-drying process of the traditional wet bonding method by using the dry bonding method. The production speed will be increased and the detect rate will be reduced significantly.

Another object of the present invention is that the operator doesn't have to be well-experienced for the dry bonding method. The production will be sustainable by settling the production parameters. Decreasing both of operator's working experience requirement and risk of human inappropriate operation.

To achieve the above objects, the present invention relates to a method for manufacturing paper straw comprising:

a paper roll transmission step: transmitting a raw paper toward a connection position from a plurality of raw paper rolls jointly, the raw paper strip includes a paper material and a dry hot-melt adhesive;

a paper heating step: heating the raw paper strip for changing the dry hot-melt adhesive of the raw pater strip into a flow hot-melt adhesive;

a bonding and shaping step: transmitting the raw paper strips to the connection position for rolling jointly so that the flow hot-melt adhesives are bonded on another raw paper strip respectively to form a pipe; and a cutting step: cutting the pipe to form at least one paper straw after the pipe exceeds a setting length.

The paper straw contains an outer paper layer, a middle paper layer, an inner paper layer, a first hot-melt adhesive is positioned between the outer paper layer and the middle paper layer and a second hot-melt adhesive is positioned between the middle paper layer and the inner paper layer. The width of the outer paper layer is larger than the width of the middle paper layer, and the width of middle paper layer is larger than the width of the inner paper layer.

The first hot-melt adhesive and the second hot-melt adhesive contain: an acrylic acid copolymer 40%~45%, a water 55%~60% and an ammonia water less than 0.1% or equal to 0.1%.

The heating temperature of the paper heating step is between 80° C.~200° C.

In an operable embodiment, the paper heating step is using at least one of a hot wind machine, an infrared machine, a heating machine or a microwave machine for heating in front of the connection position. In another operable embodiment, the paper heating step is using a heat-rolling machine for heating and bonding jointly at the connection position.

Moreover, in a preferable embodiment, the manufacture method further comprises following steps before the paper roll transmission step:

a paper material coating step: coating the flow hot-melt adhesive on at least one surface of the paper material to form a processed paper;

an adhesive drying step: drying the flow hot-melt adhesive of the processed paper and the flow hot-melt adhesive being changed into the dry hot-melt adhesive;

a paper rolling step: rolling the processed paper to form a raw elongated paper roll;

an elongated paper roll cutting step: cutting the raw elongated paper roll according to a processing length to form a plurality of raw paper rolls.

Further, in another preferable embodiment, the manufacture method further comprises following steps before the paper roll transmission step:

a paper material coating step: coating the flow hot-melt adhesive on at least one surface of the paper material to form a processed paper;

an adhesive drying step: drying the flow hot-melt adhesive of the processed paper and the flow hot-melt adhesive being changed into the dry hot-melt adhesive;

a paper rolling step: rolling the processed paper to form the raw paper roll;

In the above two preferable embodiments, the drying temperature of the adhesive drying step is between 40° C.~80° C.; the paper material coating step is choosing one of scrap coating, roll coating, spray coating or flow coating.

From above description, the characteristic of present invention is the raw paper strips that comprise the paper material and the dry hot-melt adhesive. Therefore, the raw paper strips are able to be heated for rolling and bonding to form a pipe, for increasing the viscosity between paper materials and preventing the excessive glue and fall-off problem in traditional method, and mold phenomenon. Moreover, an extra adhesive-drying process is unnecessary after bonding and cutting the pipe. The productive efficiency of paper straw will be raised significantly and the defect rate of paper straw will be reduced sufficiently.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and by referring to the accompanying drawings.

Figure 2:
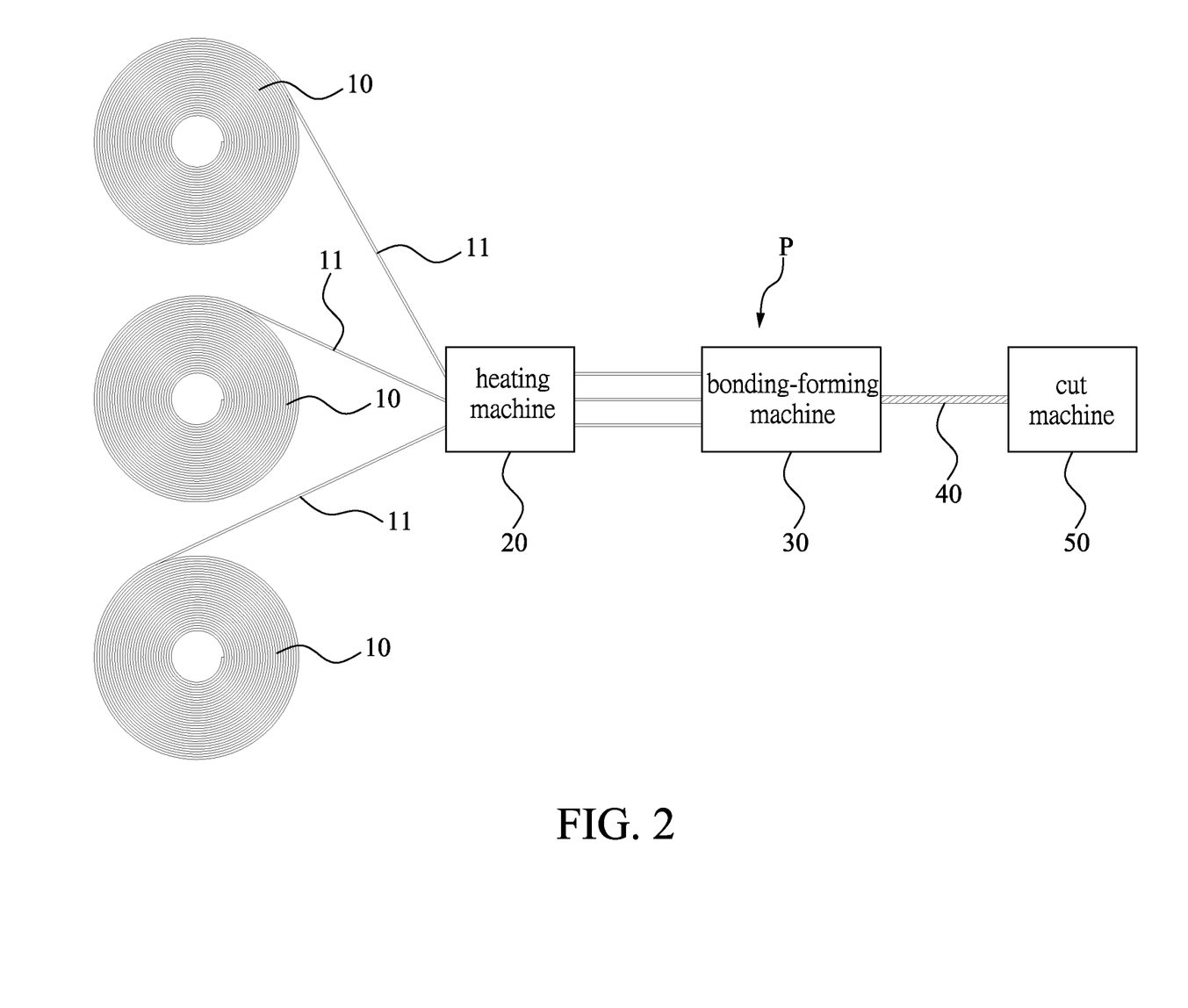
FIG. 2 is a schematic view illustrating present invention method for manufacturing a paper straw.
Figure 3:
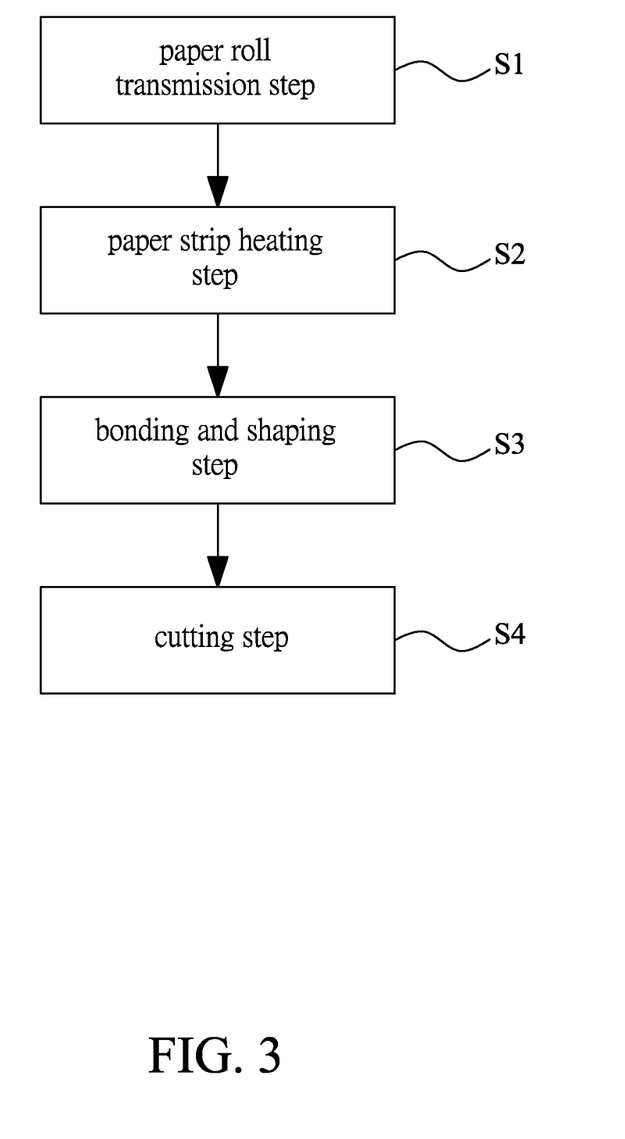
FIG. 3 is a diagram illustrating the manufacture steps of FIG. 2.
Figure 4:
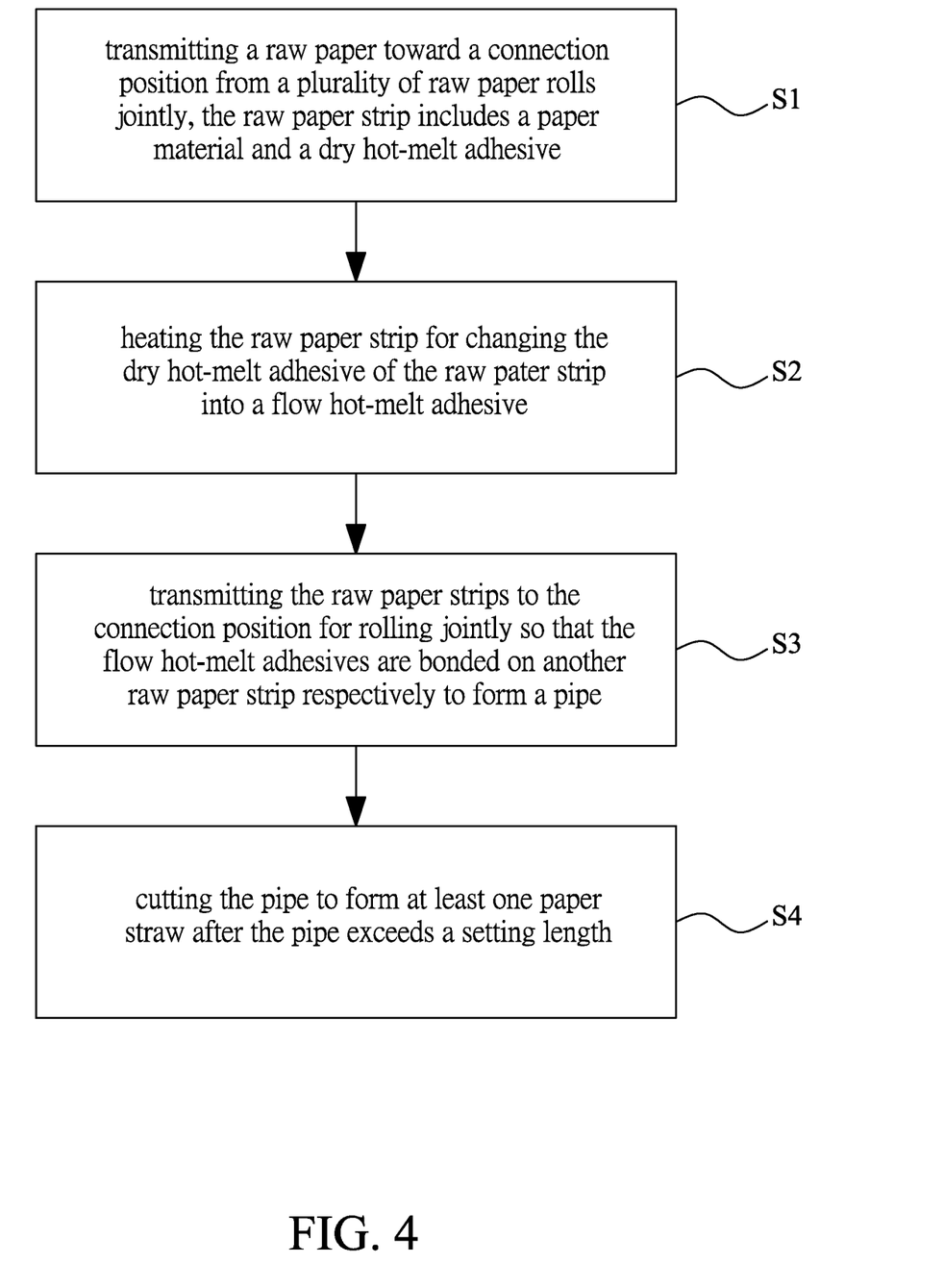
FIG. 4 is a flowchart illustrating the manufacture method of FIG. 2.

Please refer to FIG. 2 to FIG. 4. The present invention manufacture method of paper straw comprises four processing steps as following: a paper roll transmission step S1, a paper strip heating step S2, a bonding and shaping step S3 and a cutting step S4.

In the paper roll transmission step S1, a plurality of raw paper rolls 10 toward a connection position P jointly to transmit a raw paper strip 11 by a plurality of transmission devices. Wherein, the raw paper strip 11 includes a paper material and a dry hot-melt adhesive. In the paper strip heating step S2, a heating machine 20 heats the raw paper strips 11 with a heating temperature between 80° C.~200° C., so the dry hot-melt adhesive in the raw paper strip 11 is changed to a flow hot-melt adhesive. In the bonding and shaping step S3, the raw paper strips 11 are transmitted to a bonding-forming machine 30 in the connection position P for rolling jointly, so the flow hot-melt adhesives are bonded to another raw paper strip 11 separately to form a pipe 40. Wherein, the bonding-forming machine 30 comprises a cooling shaft which is covered by the pipe 40. In the cutting step S4, the pipe 40 is cut to form at least one paper straw by a moveable cutting machine 50 for synchronously moving with the pipe 40 after the pipe 40 leaving the cooling shaft and exceeding a setting length.

Figure 5:
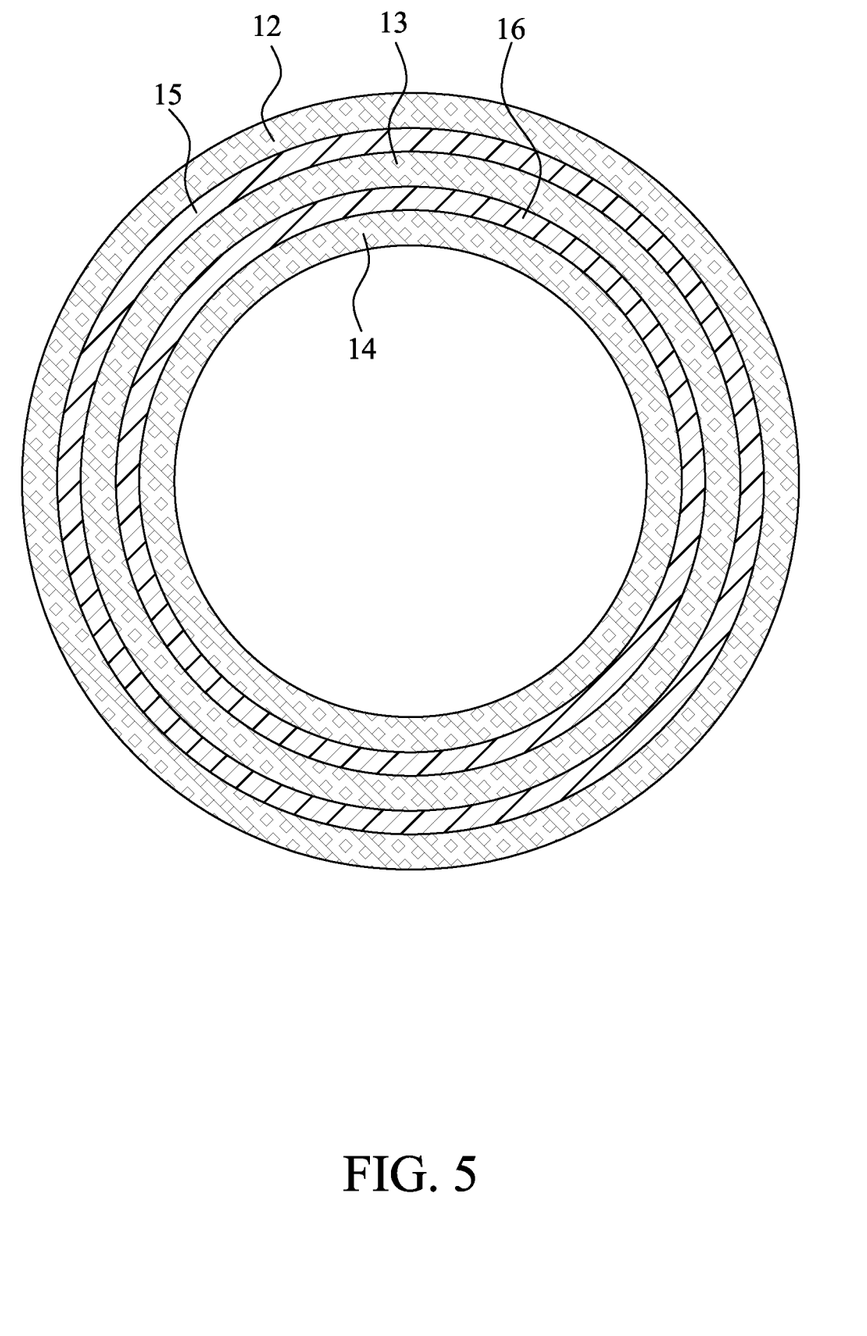
FIG. 5 is a cross-section view illustrating a pipe.

Please refer to FIG. 5. The paper straw includes an outer paper layer 12, a middle paper layer 13, an inner paper layer 14. A first hot-melt adhesive 15 is positioned between the outer paper layer 12 and the middle paper layer 13 and a second hot-melt adhesive 16 is positioned between the middle paper layer 13 and the inner paper layer 14. The width of the outer paper layer 12 is larger than the width of the middle paper layer 13. The width of the middle paper layer 13 is larger than the width of the inner paper layer 14.

Figure 6A:
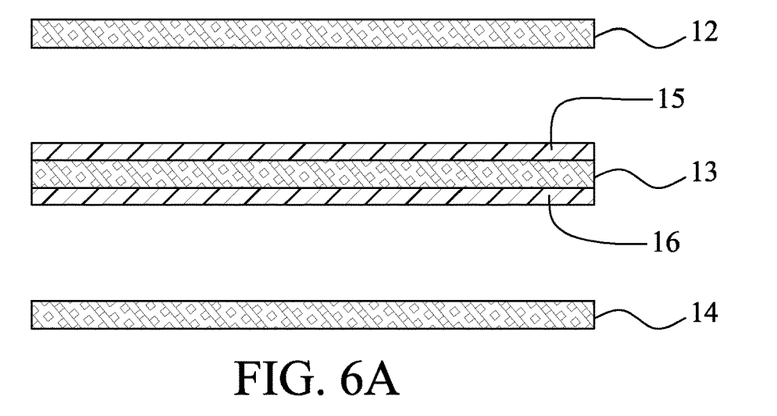
FIG. 6A to FIG. 6C are schematic views illustrating the pipes that composed of different raw paper strips.
Figure 6B:
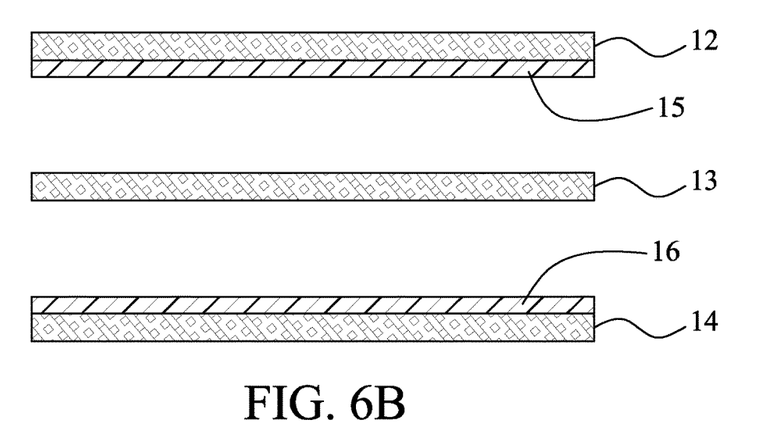
Figure 6C:
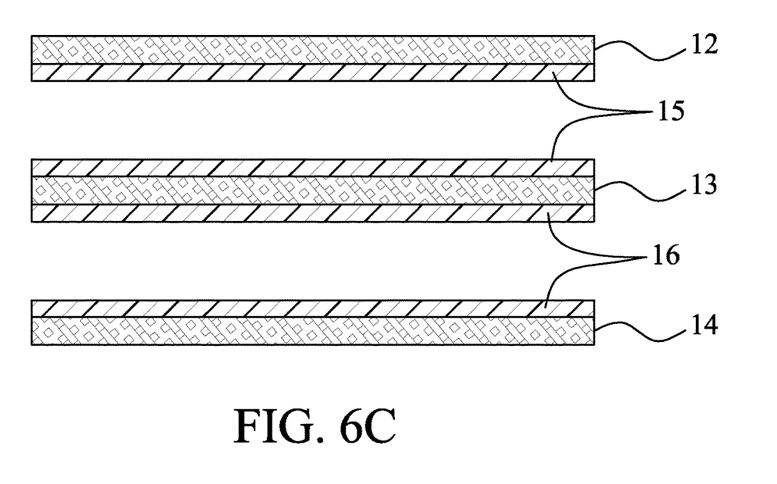

Please refer to the different embodiments in FIG. 6A and FIG. 6C. As shown in FIG. 6A. the first hot-melt adhesive 15 and the second hot-melt adhesive 16 are coated on the two opposite sides of the middle paper layer 13 respectively, and the outer paper layer 12 and the inner paper layer 14 will be bonded to the middle paper layer 13 respectively for constructing the paper straw.

As shown in FIG. 6B. the first hot-melt adhesive 15 and the second hot-melt adhesive 16 are coated on the adjacent side of the outer paper layer 12 and the adjacent side of the inner paper layer 14 respectively, and bonding the outer paper layer 12 and the inner paper layer 14 jointly to the opposite sides of the middle payer layer 13 for constructing the paper straw.

As shown in FIG. 6C. A part of the first hot-melt-adhesive and a part of the second hot-melt adhesive 16 are coated on the adjacent side of the outer paper layer 12 and the adjacent side of the inner paper layer 14 respectively, and the remained part of the first hot-melt adhesive 15 and the remained part of the second hot-melt adhesive 16 are jointly coated to the opposite sides of the middle paper layer 14. The paper straw is constructed by the combination of the hot-melt adhesives afterwards.

The present invention paper material is general standard paper, the length of 120 grams paper is 5000 meters to 6000 meters and the length of 60 grams paper is 10000 meters to 12000 meters. The width of both paper are 600 meters to 800 meters. The paper material can be various papers, like kraft paper, bristol board . . . and so on. The first hot-melt adhesive 15 and the second hot-melt adhesive 16 include: an acrylic acid copolymer 40%~45%, a water 55%~60% and an ammonia less than 0.1% or equal to 0.1%.

Moreover, in a preferable embodiments in drawings. The paper heating step is choosing at least one of the hot wind machine, the infrared machine, the heating machine or the microwave machine for heating in front of the connection position P.

In another operable embodiment, the paper heating step is using a hot-curling machine which combines both function of heating machine 20 and bonding-forming machine 30 to heating and bonding jointly at the connection position P.

Figure 7A:
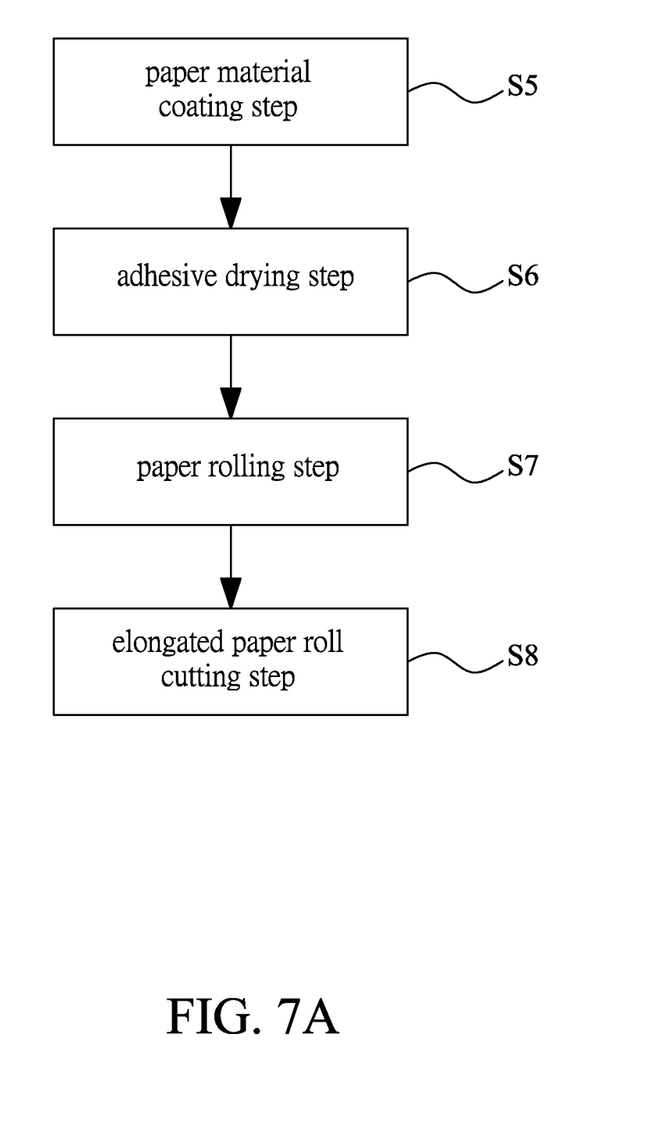
FIG. 7A and FIG. 7B are diagrams illustrating different manufacture steps before a paper roll transmission step.

Please refer to FIG. 7A. The present invention method further comprises four steps as following before the paper roll transmission step S1: a paper material coating step S5, an adhesive drying step S6, a paper rolling step S7 and an elongated paper roll cutting step S8.

In the paper material coating step S5, the flow hot-melt adhesive is coated on at least one surface of the paper material by a coating machine for forming a processed paper. The coating machine choosing one of scrap coating, roll paining, spray coating and flow coating. In the adhesive drying step S6, the flow hot-melt adhesive in the processed paper is dried by a drying machine, so the flow hot-melt adhesive will be changed into dry hot-melt adhesive; wherein, the drying temperature is 40° C.~80° C. In the paper rolling step S7, the processed paper is rolled to form a raw elongated paper roll which size is larger than the processing requirement. In the elongated paper roll cutting step S8, the raw elongated paper roll is cut according to the setting length for forming a plurality of raw paper roll 10.

Figure 7B:
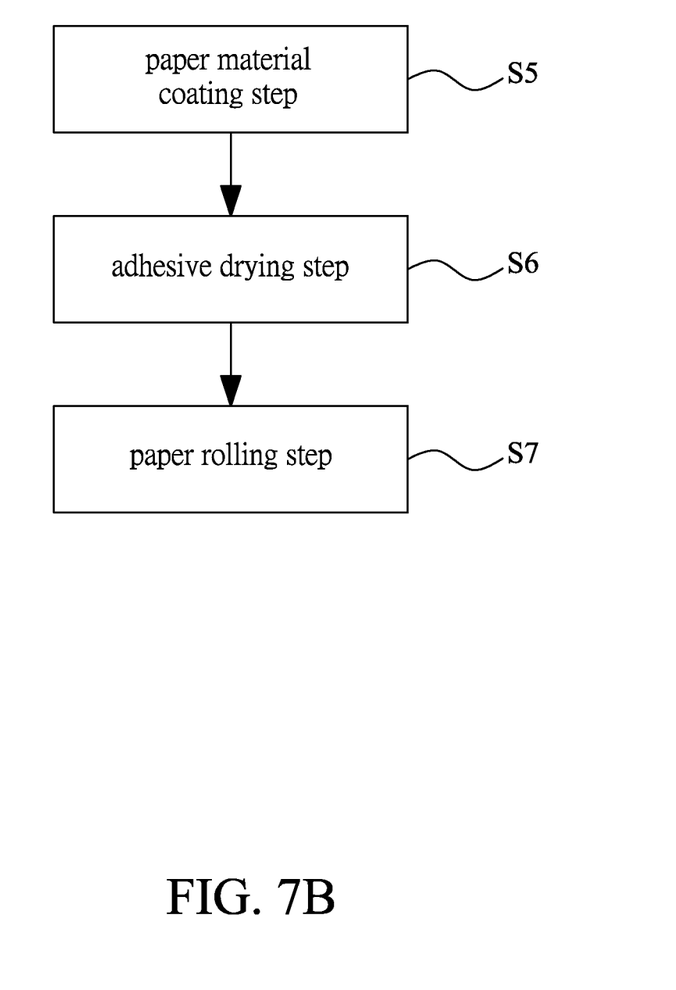

Please refer to FIG. 7B. In another preferable embodiment, the present invention method further comprises steps as following before the paper roll transmission step S1, a paper material coating step S5, an adhesive drying step S6 and a paper rolling step S7.

In the paper material coating step S5, the flow hot-melt adhesive is coated by a coating machine on at least one surface of the paper material for forming a processed paper in the same way. Similarly, in the paper material coating step S5, the coating machine is choosing one of scrap coating, roll coating, spray coating or flow coating. In the adhesive drying step S6, the flow hot-melt adhesive of the processed paper is dried by the drying machine, likewise, the flow hot-melt adhesive will be changed into dry hot-melt adhesive. Wherein, the drying temperature is between 40° C.~80° C. In the paper rolling step S7, the processed paper is directly rolled to form the raw paper roll 10.

What is claimed is:

1. A method for manufacturing a paper straw, the method comprising:
    a paper material coating step: coating a flow hot-melt adhesive on at least one surface of a paper material to form a processed paper, the flow hot-melt adhesive containing an acrylic acid copolymer of 40%~45%, water of 55%~60% and ammonia water of less than or equal to 0.1%;
    an adhesive drying step: drying the flow hot-melt adhesive in the processed paper, to thereby change the flow hot-melt adhesive into a dry hot-melt adhesive;
    a paper rolling step: rolling the processed paper to form a plurality of raw paper rolls;
    a paper roll transmission step: transmitting raw paper strips toward a connection position from the plurality of raw paper rolls jointly;
    a paper strip heating step: heating the raw paper strips for changing the dry hot-melt adhesive of the raw pater strips into a moisture-free flow hot-melt adhesive;
    a bonding and shaping step: bonding the raw paper strips at the connection position by bonding the moisture-free flow hot-melt adhesive of one of the raw paper strips with another of the raw paper strips, to thereby form a pipe; and further,
    a cutting step: cutting the pipe to form at least one paper straw after the pipe exceeds a setting length.

2. The method for manufacturing a paper straw according to claim 1, wherein
    the paper straw contains
        an outer paper layer,
        a middle paper layer,
        an inner paper layer,
    a first hot-melt adhesive being positioned between the outer paper layer and the middle paper layer and a second hot-melt adhesive being positioned between the middle paper layer and the inner paper layer; and
    a width of the outer paper layer is larger than a width of middle paper layer, and the width of the middle paper layer is larger than that of the inner paper layer.

3. The method for manufacturing a paper straw according to claim 1, wherein a heating temperature of the paper heating step is between 80° C.~200° C.

4. The method for manufacturing a paper straw according to claim 1, wherein the paper heating step includes choosing at least one of a hot wind machine, an infrared machine, a heating machine or a microwave machine for heating in front of the connection position.

5. The method for manufacturing a paper straw according to claim 1, wherein the paper heating step includes using a hot-curling machine for heating and bonding jointly at the connection position.

6. The method for manufacturing a paper straw according to claim 1, wherein a drying temperature of the adhesive drying step is between 40° C.~80° C.

7. The method for manufacturing a paper straw according to claim 1, wherein the paper material coating step includes using one of scrap coating, roll coating, spray coating or flow coating.

* * * * *